Patented Mar. 5, 1935

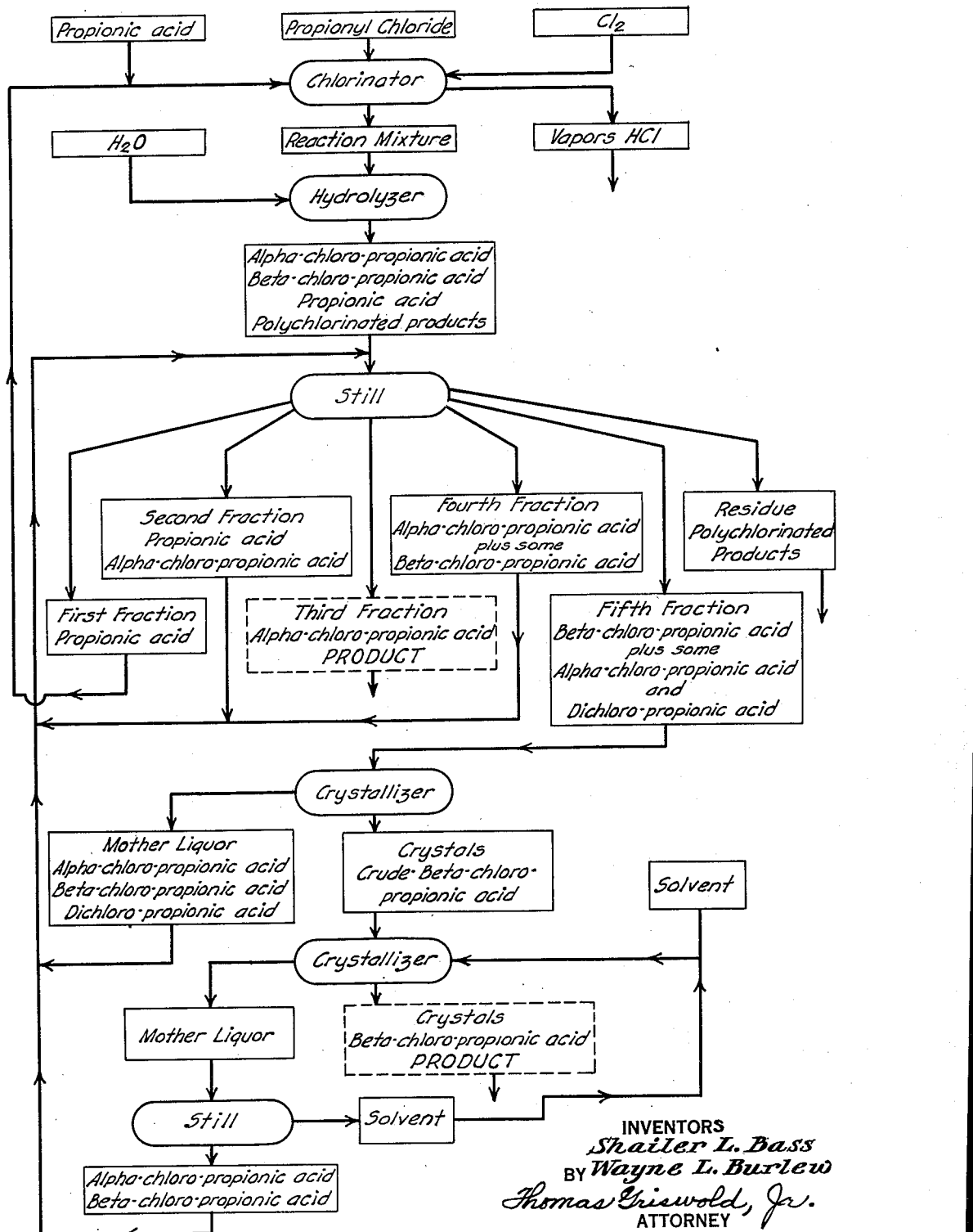

1,993,713

UNITED STATES PATENT OFFICE 1,993,713

CHLORINATION OF PROPIONIC ACID

Shailer L. Bass and Wayne L. Burlew, Midland, Mich., assignors to The Dow Chemical Company, Midland, Mich., a corporation of Michigan Application January 19, 1933, Serial No. 652,504

11 Claims. (Cl. 260—113)

The present invention concerns an improved method of chlorinating propionic acid to produce alpha- and beta-chloro-propionic acids, particularly the latter.

We have found that propionic acid may readily be chlorinated in the presence of an acyl halide to obtain a mixture of alpha- and beta-chloro-propionic acids in high yield and that each of said isomeric chloro-propionic acids may be separated from the crude chlorinated mixture in good yield.

The invention, then, consists of the method hereinafter fully described and particularly pointed out in the claims, the annexed drawing and the following description setting forth in detail but several of the various ways in which the principle of our invention may be employed.

The annexed drawing is a flow sheet showing one series of operations which may advantageously be carried out in practicing our invention.

Propionic acid itself reacts very sluggishly with chlorine, even under exposure to strong light. However, when a small quantity of an acyl halide is dissolved in the propionic acid, the chlorination may be carried out smoothly and at a relatively rapid rate. Apparently the acyl halide, e. g. propionyl chloride, serves as an intermediate reactant in the chlorination, as illustrated by the following equations:—

(1) $CH_3CH_2COCl+Cl_2 \nearrow\searrow \begin{array}{l} CH_3CHClCOCl+HCl \\ CH_2ClCH_2COCl+HCl \end{array}$ (2) $CH_3CHClCOCl+CH_3CH_2CO_2H \rightleftharpoons CH_3CHClCO_2H+CH_3CH_2COCl$ (3) $CH_2ClCH_2COCl+CH_3CH_2CO_2H \rightleftharpoons CH_2ClCH_2CO_2H+CH_3CH_2COCl$ From the above equations it may be seen that propionyl chloride is chlorinated directly to form a mixture of alpha- and beta-chloro-propionyl chlorides and that the chloro-propionyl chlorides so formed react with propionic acid to form the corresponding chloro-propionic acids and to regenerate propionyl chloride.

In place of propionyl chloride, we may employ any other acyl halide derived from a carboxylic acid, e. g. acetyl chloride, propionyl bromide, butyryl chloride, butyryl bromide, benzoyl chloride, naphthoyl chloride, etc., to promote the chlorination of propionic acid. When such other acyl halide is employed, the same reacts with propionic acid to form a propionyl halide, as illustrated by the following equation for the reaction between benzoyl chloride and propionic acid:—

$C_6H_5COCl+CH_3CH_2CO_2H \rightleftharpoons C_6H_5CO_2H+CH_3CH_2COCl$

The propionyl halide so formed serves directly to promote the chlorination of propionic acid in the manner already explained.

An acyl halide may be employed in any proportion greater than about 0.02 mole of acyl halide per mole of propionic acid to promote chlorination of the latter. In practice, we find it most economical to use between about 0.02 and 0.10 mole of acyl halide per mole of propionic acid.

In chlorinating propionic acid to obtain both alpha- and beta-chloro-propionic acids according to the present method, the reaction mixture should be substantially free from auxiliary chlorinating catalysts, e. g. the halides, oxyhalides, oxygen acids, and oxides of the elements phosphorus, arsenic, antimony, sulphur, selenium, and tellurium; the halides of the elements tin, iron, and aluminum; the halo-oxygen acids of the elements phosphorus and sulphur, etc., which are capable of forming intermediate addition compounds with acyl halides. In a copending application of S. L. Bass, Serial No. 614,640, filed May 31, 1932, it is disclosed that when propionic acid is chlorinated in the presence of any such catalyst, alpha-chloro-propionic acid is formed to the substantial exclusion of its beta isomer.

The chlorination of propionic acid in the presence of an acyl halide is catalyzed by light, but such reaction can be carried out in the absence of light. The chlorination usually proceeds smoothly at temperatures above 75° C. under the influence of diffused sunlight.

In producing alpha- and beta-chloro-propionic acids by the procedure set forth diagrammatically in the annexed drawing, chlorine is gradually introduced into a mixture of propionic acid with between 0.02 and 0.10 its molecular equivalent of propionyl chloride while stirring and maintaining the same at a temperature between about 50° and 140° C., preferably between about 80° and 100° C. The introduction of chlorine is continued until from 75 to 120 per cent, preferably from 80 to 90 per cent, of the quantity of chlorine theoretically required to monochlorinate the propionic acid has been added. The chlorination is preferably, but not necessarily, carried out in exposure to strong light.

After the chlorination is completed, the reaction mixture is treated with sufficient water to hydrolyze the propionyl chloride or other acyl halide contained therein. The mixture is then fractionally distilled, preferably under subatmospheric pressure, and a series of distillation fractions are collected. The compositions of the various fractions are, of course, dependent upon the pressure under which the distillation is carried out and the temperature ranges over which the several fractions are collected. When such distillation is carried out under 20 millimeters pressure, the following fractions may be collected:— (1) between 35° and 84° C., the fraction consisting, for the most part, of unreacted propionic acid; (2) between 84° and 94° C., containing both propionic acid and alpha-chloropropionic acid; (3) between 94° and 101° C., consisting of substantially pure alpha-chloro-propionic acid; (4) between 101° and 105° C., consisting largely of alpha-chloro-propionic acid along with some beta-chloro-propionic acid; and (5) between 105° and 112° C., consisting largely of beta-chloro-propionic acid along with relatively small quantities of alpha-chloro-propionic acid and of polychlorinated products. The major portion of the polychlorinated products remains as residue in the distilling apparatus.

Fraction (1), collected during the above described distillation, is combined with additional propionic acid and is returned to the chlorinator. Fractions (2) and (4) are again fractionally distilled, preferably along with another batch of crude chlorinated propionic acid, to separate or concentrate additional quantities of alpha- and beta-chloro-propionic acids. Fraction (3) is collected as the alpha-chloro-propionic acid product. If necessary, said product can be purified still further by again fractionally distilling the same. Fraction (5) is cooled sufficiently to crystallize beta-chloro-propionic acid therefrom and the crystals are separated from their mother liquor. The latter, which usually contains alpha- and beta-chloro-propionic acids and polychlorinated products, is again fractionally distilled, preferably along with another batch of crude chlorinated propionic acid.

The beta-chloro-propionic acid obtained through the above described crystallization is usually contaminated with a relatively small quantity of its alpha isomer. Such product can be purified by either recrystallizing or fractionally distilling the same. In practice we prefer to purify the beta-chloro-propionic acid product through recrystallization from an organic solvent. Among the wide variety of solvents which may be used for such purpose are:—liquid petroleum hydrocarbons, carbon tetrachloride, chloroform, alcohol, ether, benzene, toluene, etc. After such recrystallization, the purified, crystalline beta-chloro-propionic acid is separated from its mother liquor and the latter is fractionally distilled to separate the solvent therefrom. The solvent may be re-employed in purifying successive batches of crude beta-chloro-propionic acid. After the solvent has been removed from the last mentioned mother liquor, there remains a mixture of alpha- and beta-chloro-propionic acids. Said mixture is combined with a fresh batch of crude chlorinated propionic acid and the combined mixture is separated in accordance with the foregoing procedure.

The above description has been restricted, for the sake of clarity, to the employment of propionyl chloride as an agent to promote the chlorination of propionic acid. As has previously been stated, we may employ any acyl halide derived from a carboxylic acid to promote such reaction. If an acyl halide other than propionyl chloride or chloro-propionyl chloride is employed, an organic acid other than propionic acid is formed. Such other organic acid can usually be separated from the chlorinated mixture during the step of fractionally distilling the latter.

The previously described step of treating a crude chlorinated propionic acid mixture with water to hydrolyze the acyl halide present may, if desired, be eliminated from the process and the acyl halide may be separated from the desired products during the step of fractionally distilling the crude chlorinated mixture. If propionyl chloride is the agent employed to promote the chlorination, said compound can be fractionally distilled from the chlorinated mixture along with any unreacted propionic acid present. The resultant mixture of propionic acid and propionyl chloride can be chlorinated directly to obtain additional quantities of alpha- and beta-chloro-propionic acids.

The following examples set forth two ways in which the principle of our invention has been practiced. It is to be understood, however, that said examples are purely illustrative and are not to be construed as a limitation on the invention.

*Example 1*

Into a reactor provided with a mechanical stirrer, an inlet for chlorine, and an outlet for gaseous products were placed 296 grams (4.0 moles) of propionic acid and 10 grams (0.08 mole) of alpha-chloro-propionyl chloride. 297 grams (4.18 moles) of chlorine was passed, at a rate of about 0.10 gram of chlorine per minute, into the reaction mixture while stirring and maintaining the latter at a temperature between about 75° and 80° C. During the entire chlorination, the reaction mixture was illuminated by light from a 250 watt electric light bulb located about 3 feet from the reactor. After the chlorination was completed, 10 grams of water was added to the chlorinated mixture. The latter was then fractionally distilled at 25 millimeters pressure. The distillation fractions described in the following table were collected:—

*Table 1*

| Fraction No. | Weight grams | Distilling range ° C. | Approximate composition |
| --- | --- | --- | --- |
| 1 | 31.2 | 35–84 | Mostly propionic acid. |
| 2 | 25.3 | 84–94 | Propionic acid plus alpha-chloro-propionic acid. |
| 3 | 54.2 | 94–101 | Alpha-chloro-propionic acid. |
| 4 | 112.4 | 101–105 | Alpha-chloro-propionic acid plus some beta-chloro-propionic acid. |
| 5 | 115.4 | 105–108 | Beta-chloro-propionic acid plus some alpha-chloro-propionic acid. |
| 6 | 75.0 | 108–112 | Beta-chloro-propionic acid plus some polychlorinated products. |

As a residue from the distillation there was obtained 23.3 grams of polychlorinated products. 2.3 grams of beta-chloro-propionic acid was crystallized from the above fraction (4) by cooling the latter to 0° C. Fractions (5) and (6) were combined and dissolved in about 200 grams of petroleum ether. By cooling the resultant solution to about 0° C., 124 grams of pure beta-chloropropionic acid was crystallized therefrom. The mother liquor remaining after the last mentioned crystallization was fractionally distilled, first at atmospheric pressure to remove the solvent therefrom and then at 28 millimeters pressure to effect a further separation of the beta-chloro-propionic acid. From the distillation carried out at 28 millimeters pressure, the following fractions were collected:— (a) 18.4 grams of a fraction distilling between 110° and 115° C., and (b) 47.3 grams of a fraction distilling between 115° and 120° C. 10 grams of beta-chloro-propionic acid was crystallized from fraction (b) by cooling the latter to about —5° C. From the reaction mixture, then, there had been isolated 54.2 grams of substantially pure alpha-chloro-propionic acid and a total of 131.3 grams of substantially pure beta-chloro-propionic acid. The yield of mono-chloro-propionic acids isolated during the single series of operations described above was 45 per cent of theoretical, based on the quantity of propionic acid employed.

*Example 2*

360 grams (5.0 moles) of chlorine was passed, at a rate of 0.3 gram of chlorine per minute into a mixture of 296 grams (4.0 moles) of propionic acid and 4.6 grams (0.05 mole) of propionyl chloride. The reaction mixture was stirred and maintained at about 100° C. during the chlorination and the entire chlorination was carried out in the absence of light. During the chlorination, 4.28 moles of hydrogen chloride was evolved from the reaction mixture. After the chlorination was completed, the mixture was fractionally distilled and the fractions described in Table 2 were collected.

*Table 2*

| Fraction No. | Weight grams | Pressure millimeters | Distilling range ° C. | Approximate composition |
|---|---|---|---|---|
| 1 | 69.2 | 7.5–10 | 36–87 | Priopionyl chloride, propionic acid, alpha-chloro-propionic acid. |
| 2 | 125.2 | 10 | 87–95 | Alpha-chloro-propionic acid plus some beta-chloro-propionic acid. |
| 3 | 127.2 | 10 | 95–105 | Beta-chloro-propionic acid plus some alpha-chloro-propionic acid. |
| 4 | 60.6 | 10–16.5 | 105–132 | Beta-chloro-propionic acid, polychlorinated products. |

10 grams of polychlorinated products were obtained as a residue from the distillation. Beta-chloro-propionic acid crystallized from Fraction (3) on standing. The crystals were separated from their mother liquor and the latter was cooled to —5° C., whereby a second crop of beta-chloro-propionic acid was obtained. A total of 70.2 grams of crystalline beta-chloro-propionic acid was obtained.

If desired, a chlorination according to the present method may be carried out in the presence of a relatively inert reaction medium, such as carbon tethachloride, benzene, toluene, etc. However, such medium is not required and its use entails the extra expense and loss of material involved in separating the same from the reaction products.

When a relatively low boiling acyl halide, e. g. acetyl chloride, is employed to promote the chlorination of propionic acid, such chlorination may advantageously be carried out under superatmospheric pressure. The chlorination may be carried out smoothly at temperatures between about 50° and 140° C. regardless of the pressure employed.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises chlorinating propionic acid in the presence of a carboxylic acid halide, the chlorination mixture being substantially free of auxiliary catalysts capable of forming intermediate addition compounds with carboxylic acid halides.

2. The method which comprises chlorinating propionic acid in the presence of a propionyl halide, the chlorination mixture being substantially free of auxiliary catalysts capable of forming intermediate addition compounds with carboxylic acid halides.

3. The method which comprises chlorinating propionic acid in the presence of propionyl chloride, the chlorination mixture being substantially free of auxiliary catalysts capable of forming intermediate addition compounds with carboxylic acid halides.

4. The method which comprises chlorinating propionic acid in the presence of a carboxylic acid halide at a temperature between about 50° and about 140° C., the chlorination mixture being substantially free of auxiliary catalysts capable of forming intermediate addition compounds with carboxylic acid halides.

5. The method which comprises treating propionic acid with between 75 and 120 per cent of its molecular equivalent of chlorine, in the presence of a carboxylic acid halide, at a temperature between about 50° C. and about 140° C. while exposing the reacting mixture to actinic light, the chlorination mixture being substantially free of auxiliary catalysts capable of forming intermediate addition compounds with carboxylic acid halides.

6. The method which comprises treating propionic acid with between 80 and 90 per cent of its molecular equivalent of chlorine, in the presence of an acyl halide selected from the class consisting of propionyl halides and chloro-propionyl halides, at a temperature between about 80° and about 100° C., while stirring the reacting mixture and exposing the same to actinic light, the chlorination mixture being substantially free of auxiliary catalysts capable of forming intermediate addition compounds with carboxylic acid halides.

7. The method which comprises treating propionic acid with between 80 and 90 per cent of its molecular equivalent of chlorine, in the presence of propionyl chloride, at a temperature between about 80° and about 100° C., while stirring the reacting mixture and exposing the same to actinic light, the chlorination mixture being substantially free of auxiliary catalysts capable of forming intermediate addition compounds with carboxylic acid halides.

8. In a method of making alpha- and beta-chloro-propionic acids, the steps which consist in chlorinating propionic acid in the presence of a carboxylic acid halide, but in the absence of auxiliary catalysts capable of forming intermediate addition compounds with carboxylic acid halides, and thereafter fractionally distilling the chlorinated mixture to separate alpha-chloro-propionic acid therefrom and to concentrate the beta-chloro-propionic acid contained therein.

9. In a method for making alpha- and beta-chloro-propionic acids, the steps which consist in treating, at a temperature between about 50° and about 140° C., propionic acid with between 75 and 100 per cent of its molecular equivalent of chlorine in the presence of a propionyl halide and in the absence of auxiliary catalysts capable of forming intermediate addition compounds with carboxylic acid halides, and thereafter fractionally distilling the chlorinated mixture to separate alpha-chloro-propionic acid therefrom and to concentrate the beta-chloro-propionic acid contained therein.

10. In a method of making alpha- and beta-chloro-propionic acids, the steps which consist in chlorinating propionic acid in the presence of propionyl chloride and in the absence of auxiliary catalysts capable of forming intermediate addition compounds with carboxylic acid halides, fractionally distilling the chlorinated mixture to obtain a fraction consisting largely of unreacted propionic acid, another fraction consisting substantially of alpha-chloro-propionic acid, another fraction consisting largely of beta-chloro-propionic acid as well as intermediate fractions containing both the alpha- and beta-chloro-propionic acids, returning the unreacted propionic acid fraction to the chlorination, returning the intermediate fractions to the distillation and crystallizing beta-chloro-propionic acid from the fraction rich in said compound.

11. In a method of making alpha- and beta-chloro-propionic acids, the steps which consist in chlorinating propionic acid in the presence of propionyl chloride and in the absence of auxiliary catalysts capable of forming intermediate addition compounds with carboxylic acid halides, treating the chlorinated mixture with sufficient water to hydrolyze all acyl chlorides present into the corresponding acids, then fractionally distilling the reaction mixture to obtain a fraction consisting largely of unreacted propionic acid, another fraction consisting substantially of alpha-chloro-propionic acid, another fraction rich in beta-chloro-propionic acid as well as intermediate fractions containing both of said chloro-propionic acids, returning the unreacted propionic acid fraction to the chlorination, returning the intermediate fractions to the distillation, fractionally crystallizing beta-chloro-propionic acid from the fraction rich in said compound and purifying the beta-chloro-propionic acid product by recrystallizing the same from an organic solvent.

SHAILER L. BASS.
WAYNE L. BURLEW.